June 22, 1954    F. H. S. ROSSIRE    2,681,777
AUTOMATIC STEERING SYSTEM
Filed June 28, 1949    3 Sheets-Sheet 3

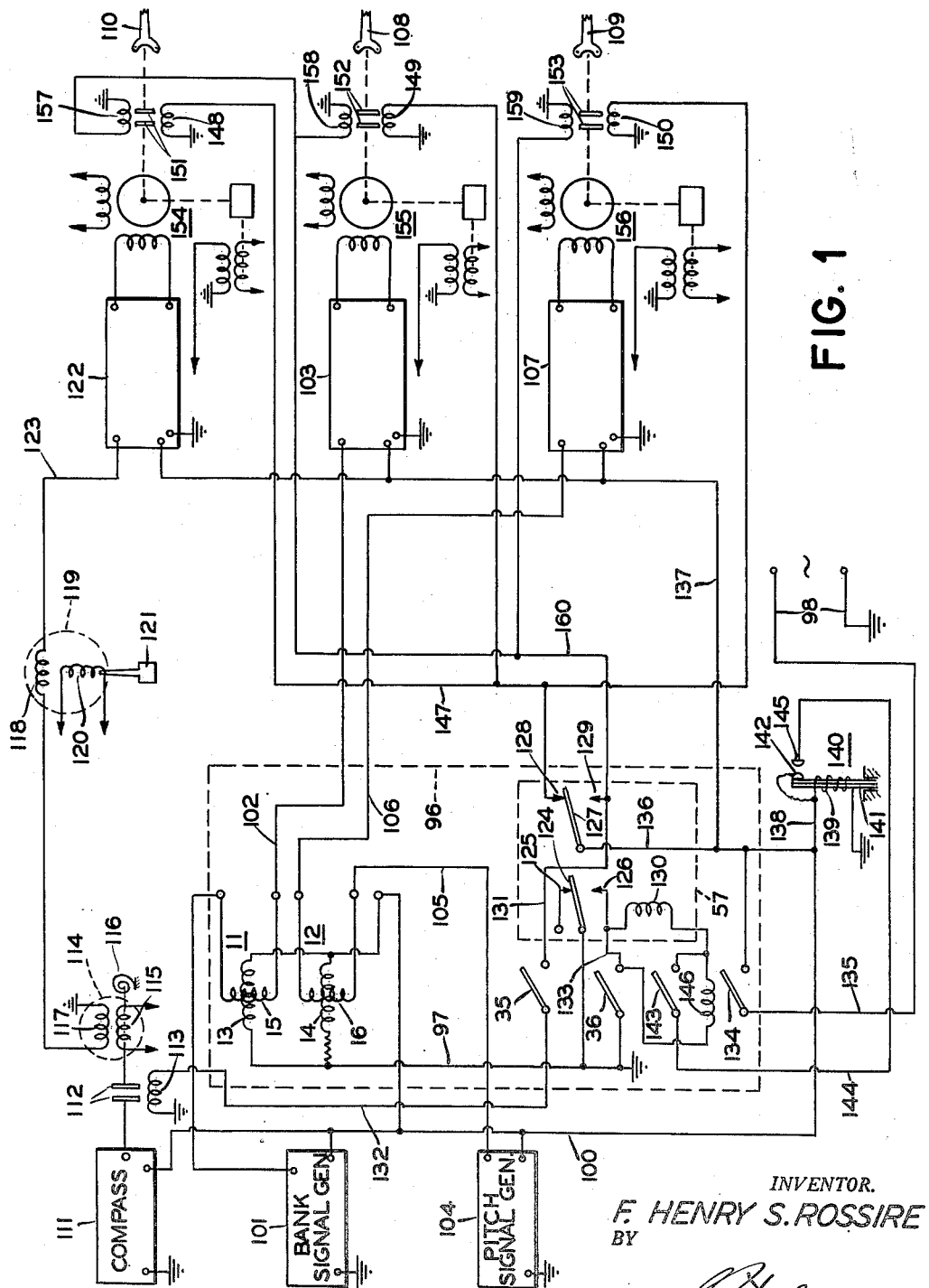

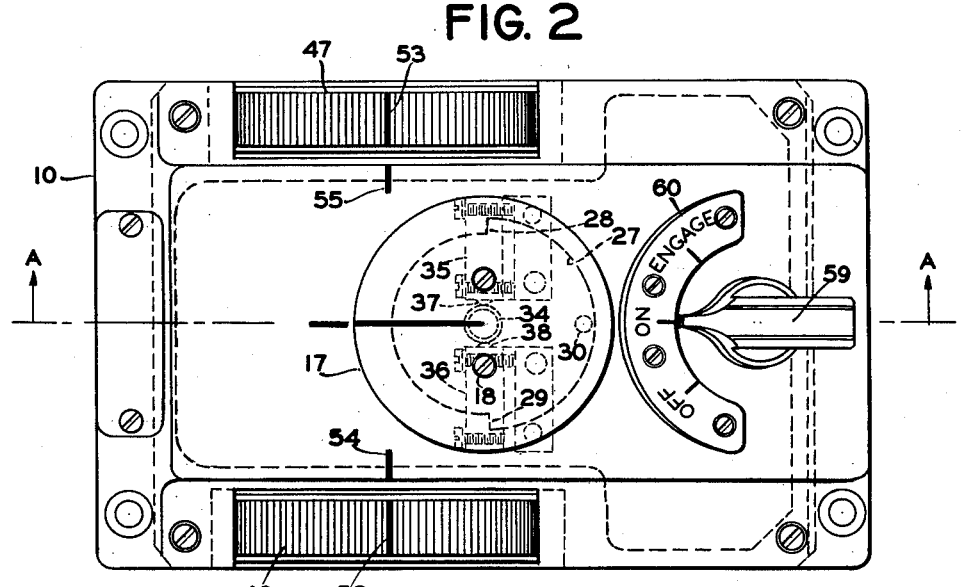
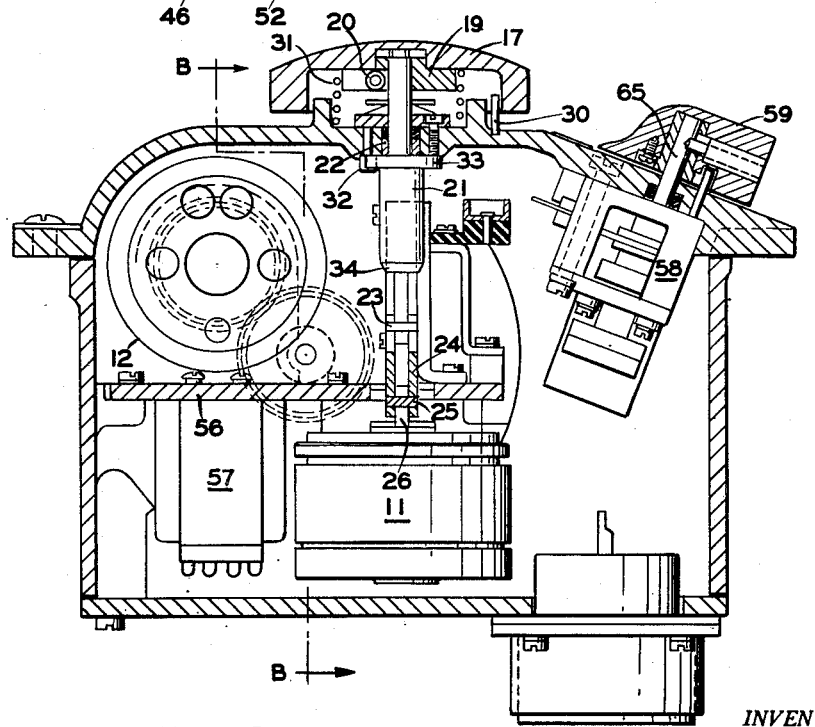

INVENTOR.
F. HENRY S. ROSSIRE
BY
ATTORNEY

Patented June 22, 1954

2,681,777

UNITED STATES PATENT OFFICE 2,681,777

AUTOMATIC STEERING SYSTEM

Francis Henry S. Rossire, Leonia, N. J., assignor to Bendix Aviation Corporation, Teterboro, N. J., a corporation of Delaware Application June 28, 1949, Serial No. 101,868

10 Claims. (Cl. 244—77)

This invention generally relates to automatic steering systems for mobile craft such as aircraft, for example, and more particularly to novel provisions in the form of a manual trim and/or turn controller unit incorporating safety interlocks permitting engagement of the automatic pilot with a craft only when certain predetermined conditions are satisfied.

An object of the present invention is to provide a novel manual turn and/or trim controller unit for an automatic pilot whereby coordinated craft turns may be obtained.

Another object of the invention is to provide a novel manual turn controller unit for an automatic steering system for an aircraft incorporating a novel switching arrangement whereby engagement of the automatic pilot for craft control can be accomplished only when certain desirable conditions exist.

A further object is to provide an automatic pilot system for an aircraft with a novel interlock arrangement whereby the pilot may be engaged with the craft for the control thereof only when certain desirable conditions exist thereby overcoming disturbing forces on the craft which would otherwise occur.

A still further object of the invention is to provide a novel manual controller unit for an automatic pilot having a turn knob which may be adjusted by the palm of the human pilot to subject the craft into a turn, a pitch trim knob being provided on either side of the turn knob rotatable about an axis normal to the axis of rotation of the turn knob for engagement by the thumb of the left or right hand of the human pilot depending upon which hand is used for setting in the desired turn.

The above and other objects and advantages of the present invention will appear more fully hereinafter from a consideration of the detailed description which follows, taken together with the accompanying drawings wherein one embodiment of the invention is illustrated. It is to be expressly understood, however, that the drawings are for the purpose of illustration and description only and are not designed as a definition of the limits of the invention.

In the drawings wherein like reference characters refer to like parts throughout the several views, Figure 1 is a diagrammatic illustration of an automatic pilot incorporating the novel manual controller unit hereof together with the novel interlock switching arrangement embraced thereby;

Figure 2 is a top elevation view of the novel manual controller unit constituting the subject matter of the present invention;

Figure 3 is a side elevation view in section of the novel controller hereof taken substantially along line 3—3 of Figure 2;

Figure 4:
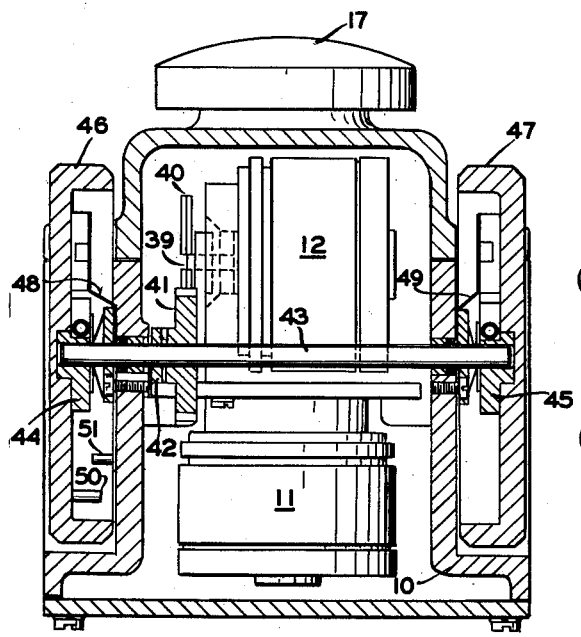
Figure 4 is an end elevation view in section of the controller taken substantially along line 4—4 of Figure 3.

Referring now to the drawings for a more detailed description of the present invention and more particularly to Figures 2 to 4, thereof, the novel controller unit hereof is shown as comprising a generally rectangular casing 10 supporting inductive turn and pitch trim devices 11 and 12 therein. Both devices have movable wound rotors 13 and 14, respectively, as well as inductively coupled fixed wound stators 15 and 16 (Figure 1).

A rotatable and longitudinally displaceable turn knob 17 is provided for displacing wound rotor 13 of device 11 relative to its stator. To this end, knob 17 is fastened by suitable screws 18 to a clamp member 19 which, by way of a screw 20, fastens the knob to a turn shaft 21 which is journalled in a bearing 22 supported in an opening formed in casing 10. The lower extremity of shaft 21 carries a transverse pin 23 which engages with a slotted collar 24 to permit longitudinal displacement of the turn shaft relative to the slotted collar. The lower end of collar 24 receives a transverse pin 25 which is carried by a shaft 26 supporting rotor winding 13 thereon. It will now be apparent that by angularly positioning turn knob 17, rotor winding 13 of inductive turn device 11 will be positioned a corresponding amount to develop in the stator winding a desired turn signal for controlling the ailerons in a manner to presently appear.

The underside of knob 17 is hollow and formed with an enlarged sector 27 whose end walls 28 and 29 define abutments for a pin 30 carried by casing 10. In this manner angular motion of knob 17 is limited by walls 28 and 29. A spring 31 interposed between the underside of knob 17 and casing 10 normally urges knob 17 to the inoperative position shown in Figure 3 in which the knob is held against rotation. Locking means is provided for holding the turn knob against rotation comprising a pin 32 carried by casing 10 and a disc 33 fastened to the turn shaft and having a slot for cooperation with the pin.

Turn shaft 21 also supports a cam surface 34 thereon which, in the inoperative position of the shaft, clears a pair of opposed micro type switches 35 and 36, the switches having normally outwardly pressed contact actuating buttons 37 and 38, respectively. As is known with switches of this character they are normally in a closed position but when knob 17 is pressed downwardly against spring 31 to bring the slot of disc 33 out of registry with pin 32 cam surface 34 moves downwardly to engage and depress buttons 37 and 38 to open switches 35 and 36 in a manner and for a purpose to presently appear.

Rotor winding 14 of inductive pitch trim device 12 is supported by a shaft 39 (Figure 4) which has a split anti-back-lash gear 40 secured thereto, the gear meshing with a gear 41 which has a hub 42 by way of which gear 41 is pinned to a transverse shaft 43 for movement by the latter. The outer extremities of shaft 43 have clamp members 44 and 45 fastened thereto, pitch trim knobs 46 and 47 being fastened by suitable means to the clamp members. Trim knobs 46 and 47 are hollow and at their underside engage with springs 48 and 49 which frictionally engage and hold the trim knobs in an adjusted position. Knob 46, furthermore, is provided with a stop pin 50 which may engage with one of two limit stops 51 carried by casing 10 to thereby define limits of movement for both trim knobs. Displacement of either of the pitch trim knobs, therefore, will angularly displace rotor winding 14 relative to stator 16 to thereby develop a pitch signal for elevator control in a manner to presently appear.

As more clearly shown in Figures 2 and 4 of the drawings, both sides of casing 10 are recessed to confine trim knobs 46 and 47 therein, each knob being provided with a reference marker 52 and 53 thereon, the markers cooperating with fixed indices 54 and 55 etched or otherwise suitably arranged on casing 10. When markers 52 and 53 are lined up with the indices, rotor winding 14 will be in a null or non-signal generating position relative to stator 16. In a similar manner turn knob 17 is provided with a reference marker for cooperation with an index on the casing so that when both marker and index coincide, rotor winding 13 will be in a null or non-signal generating position relative to stator 15.

In addition to the foregoing described elements, the interior of casing 10 supports by way of a bracket 56 a relay 57 as well as a switch 58, the latter being secured to the underside of an inclined wall formed on the cover of casing 10, the switch being actuable by a selector knob 59 arranged on the outside of the casing. Selector knob 59, as shown on Figure 2, has three positions, i. e., "Off," "On" and "Engage" as designated on a selector plate 60 attached to the casing cover.

In accordance with one novel feature of the present invention, the manual controller hereof is so arranged that the human pilot may rest his hand on the top of the unit and by depressing turn knob 17 downwardly and thereafter moving his palm on the knob the latter may be displaced in either direction to thereby subject the craft into a turn maneuver. At the same time, if the human pilot is using his left hand for setting in the turn he may engage trim knob 47 with the thumb of his left hand to insert a desired pitch trim condition or, if he uses his right hand for the operation, he may engage trim knob 46 with the thumb of that hand to insert the necessary pitch trim without lifting his hand in either case from the controller.

Figure 6:
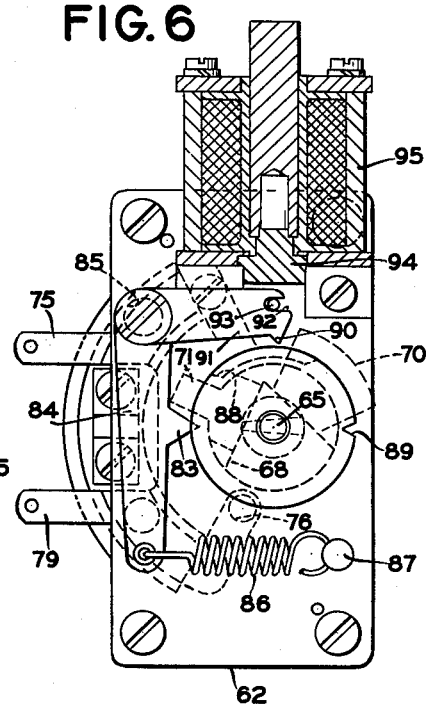
Figure 6 is an end elevation view with the solenoid in section of the switch of Figure 5; and, Figure 7 is a detail view of a portion of the mechanism of the switch of Figure 6.
Figure 5:
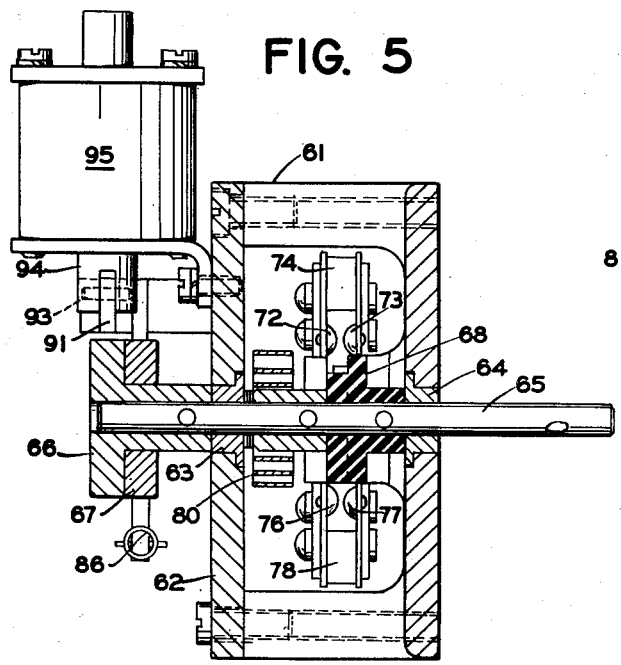
Figure 5 is a side elevation view in section of the novel switch incorporated in the controller unit of Figure 2.

As more fully shown in Figures 5 and 6 of the drawings, switch 58 comprises a casing 61 whose open end is closed by a cover 62, the cover and the end wall of the casing being apertured to receive suitable bearings 63 and 64 for rotatably mounting a rod or shaft 65 therein, one end of the shaft having selector knob 59 attached thereto and the other end having two cam members 66 and 67 fastened thereto. Mounted for movement by shaft 65 within housing 61 is an insulating member 68 for supporting a conductor element 70 (Figure 6) thereon as well as a spaced conductor element 71. Conductor element 70 is adapted, under certain conditions, to pass between and engage with a pair of spaced contacts 72 and 73 (Figure 5) to close a circuit through a contact assembly 74 having terminals 75 while conductor element 71 is adapted to pass between and engage with a pair of spaced contacts 76 and 77 to close a circuit through a contact assembly 78 having terminals 79.

Figure 7:
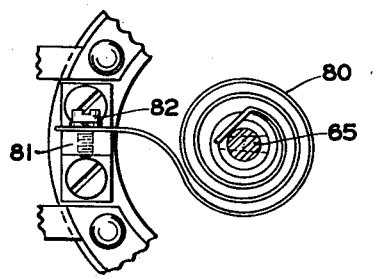

With the various parts of the switch mechanism in the position shown in Figure 6, the switch is in its "Off" position, it being maintained in such position by means of a coil spring 80 anchored at one end to shaft 65 and at its other end to a block 81 (Figure 7), supported on casing 61, by way of a screw 82. Cam 67 may be provided with a notch on its outer periphery so as to cooperatively receive a detent 83 therein, the detent being carried by a lever 84 pivoted at one end on a stud 85 and yieldably urged in the direction of the cam by way of a spring 86 whose free end is anchored to a pin 87 mounted on plate 62.

As shaft 65 is angularly displaced against spring 80 by selector knob 59 in a counter-clockwise direction, as viewed in Figure 6, from the "Off" to the "On" position, detent 83 leaves the notch of cam 67 and conductor element 70 passes between and closes the circuit between contacts 72 and 73 at which time detent 83 will be positioned opposite a slot 88 in cam 67 and will be urged by spring 86 to engage with such slot. In this manner the switch will be locked and maintained in the "On" position in spite of the fact that spring 80 tends to rotate it to its "Off" position.

Continued rotation of shaft 65 by the selector knob in a counter-clockwise direction to the switch "Engage" position causes conductor element 71 to pass between and close the circuit of contacts 76 and 77. While conductor element 70 is also moved by shaft 65 it is wider than element 71 so that as the latter engages contacts 76 and 77 element 70 will continue to engage with contacts 72 and 73. During rotation of both conductor elements, a slot 89 on the periphery of cam 66 is positioned opposite a detent 90 carried by a lever 91 whose opposite end is pivoted on stud 85. The end of the lever supporting detent 90 is slotted as at 92 for cooperation with a pin 93 which is carried by the slotted end of a plunger 94 of a solenoid 95. As will presently appear if certain conditions are satisfied at this time, solenoid 95 will have become energized, ejecting plunger 94 downwardly and thereby forcing detent 90 into registry with slot 89. In this manner the switch will be locked in its "Engage" position. If the desired conditions are not satisfied, however, solenoid 95 will not be energized and detent 90 will not register with slot 89 so that as soon as the human pilot turns the selector knob to its "Engage" position and releases the knob, spring 80 will return the switch to its "On" position wherein it will be held by registry of detent 83 and slot 88.

For a better understanding of the function and operation of the novel controller unit hereof and the novel selector switch embodied thereby reference is made to Figure 1 of the drawings wherein the unit is shown in its relation to a three axes of control automatic pilot. Inductive turn device 11 and inductive pitch trim device 12 as well as the various switches are all shown as contained within a single enclosure represented by the dotted line rectangle 96. One side of rotor windings 13 and 14 is grounded by way of a lead 97 while the other side is connected for energization with a suitable source of power 98 by way of a lead 100. One end of stator winding 15 of inductive turn device 11 is connected with a bank signal generator 101 and the opposite end thereof is connected by way of a lead 102 with the input of an aileron channel amplifier 103. One end of stator winding 16 of inductive pitch trim device 12, on the other hand, connects with a pitch signal generator 104 by way of a lead 105 and the other end thereof connects by way of a lead 106 with the input of an elevator channel amplifier 107. While bank and pitch signal generators 101 and 104 have been shown as separate elements for the control of aileron and elevator surfaces 108 and 109 they generally are mounted in a well known manner on a single horizon gyro (not shown).

In an automatic pilot of this character signals for the control of a rudder surface 110 are developed by a compass 111 which, when clutch plates 112 are engaged due to energization of a coil 113, drives an inductive signal transmitter device 114, the rotor 115 of which is normally urged by a spring 116 into a null position. Stator 117 of device 114 is connected in series with the stator 118 of an inductive device 119 whose rotor 120 is positioned relative to the stator by a pendulum 121, the latter being mounted with its axis of rotation parallel to the longitudinal axis of the craft. The opposite end of stator 118 connects with the input of a rudder channel amplifier 122 by way of a lead 123. Under certain conditions to presently appear, coil 113 is de-energized so that compass 111 is disconnected from the rudder and the latter remains under the sole control of pendulum 121.

Relay 57 includes a first movable armature 124 for cooperation with a pair of spaced contacts 125 and 126 and a second movable armature 127 for cooperation with a pair of spaced contacts 128 and 129. The relay also includes a coil 130 which, when energized, draws armatures 124 and 127 into engagement with contacts 126 and 129, and which, when de-energized, permits the armature to engage with contacts 125 and 128, respectively.

One terminal of switch 35 (corresponding to micro type switch 35 of Figure 2) is connected with relay contact 129 by way of a lead 131 and the other terminal is connected by way of a lead 132 to coil 113, the opposite end of the coil being grounded as shown. One terminal of switch 36 (corresponding to switch 36 of Figure 2), on the other hand, is grounded by connection to lead 97 and the other terminal connects with relay contact 126 by way of a lead 133.

A switch 134, representing contacts 72 and 73 together with conductor element 70 of switch 58, has one of its terminals connected by way of a lead 135 with power source 98 and the other terminal thereof connected by way of a lead 136 with relay armature 127. In addition to its connection with the relay armature the latter terminal also connects with all three amplifiers 103, 107 and 122 by way of a lead 137, by way of a lead 100 with the horizon gyro of the bank and pitch take-offs as well as the gyro utilized for stabilizing compass 111, and by way of a lead 138 with the heater coil 139 of a time delay relay 140. The free end of coil 139 is grounded as shown and is associated in heat exchange relation with a bi-metal element 141. The free end of this element supports thereon a contact 142 which connects with lead 138, a suitable insulator being provided between the bi-metal element and contact 142.

A switch 143, representing contacts 76 and 77 together with conductor element 71 of switch 58, has one of its terminals connected by way of a lead 144 with a fixed contact 145 of the time delay relay which under certain conditions is engaged by contact 142. The other terminal of the latter switch connects through a winding 146 of solenoid 95 (Figures 5 and 6) with one terminal of switch 36 as well as relay contact 126 and relay coil 130, the free end of the latter coil connecting with the same terminal of switch 143.

It may be assumed that a craft embodying the subject matter of the present invention is under manual control of the human pilot and that he desires to engage the automatic pilot to take over automatic control of the craft. It will be further assumed that selector knob 59 of switch 58 is in its "Off" position, wherein conductor elements 70 and 71 are positioned relative to contacts 72, 73 and 76, 77 as shown in Figure 6, and turn knob 17 is in its inoperative position at which time both micro type switches 35 and 36 are closed and the knob itself locked against rotation due to engagement of slotted disc 33 with pin 32. Selector knob 59 is moved from its "Off" position to its "On" position whereupon conductor element 70 engages contacts 72 and 73 so that switch 134 (Figure 1) is closed. By closing switch 134 power is communicated by way of lead 135 from the source, by way of lead 136, armature 127, contact 128 (relay coil 130 being de-energized at this time), and a lead 147 to energize windings 148, 149 and 150 to disengage servo clutches 151, 152 and 153 whereupon rudder, aileron and elevator surfaces 110, 108 and 109 are disengaged from their respective servo motors 154, 155 and 156. Closure of switch 134 also supplies power to the amplifiers by way of lead 137 and to the various gyros by way of lead 100. In addition to the above, closure of switch 134 heats coil 139 of time delay device 140 until bi-metal strip 141 bends in the direction of contact 145 to engage contact 142 therewith.

When sufficient time has elapsed for contacts 142 and 145 to engage, power is applied by way of lead 144 to one terminal of switch 143. The switch 58 is now ready for the "Engage" operation so that on moving selector knob 59 to the "Engage" position, conductor element 71 is brought into engagement with contacts 76 and 77, conductor element 70 remaining in engagement with contacts 72 and 73. This action is represented by closure of switch 143 as a result of which solenoid winding 146 is energized to depress plunger 94 and thereby force detent 90 into slot 89 to thereby maintain the switch in its "engaged" position. Relay coil 130 is also energized to move armatures 124 and 127 into engagement with their respective contacts 126 and 129. Servo clutch windings 148, 149 and 150 are deenergized and instead other windings 157, 158 and 159 are energized by way of a lead 160 whereupon clutches 151, 152 and 153 are engaged to drivably connect servo motors 154, 155 and 156 with their related control surfaces 110, 108 and 109. At the same time coil 113 is also energized by way of a lead 132, switch 35, lead 131, relay contact 129 and relay armature 127 so that compass 111 is drivably connected with inductive transmitter device 114 and the automatic pilot is thus engaged with the various control surfaces to maintain automatic craft flight.

If, thereafter, it is desired to change craft course, turn knob 17 of the controller unit is depressed by the palm of the human pilot to disengage disc 33 from pin 32 at which time switches 35 and 36 are engaged and opened by cam surface 34. On opening, switch 35 breaks the circuit to coil 113 whereupon due to de-energization of the latter the compass is disconnected from transmitter 114 and spring 116 returns the rotor of the latter to a null or non-signal generating position. Craft rudder is thus left under the sole control of pendulum 121 although such control may be supplemented by a rate gyro take-off (not shown) in a well known manner.

Subsequent to depressing turn knob 17 to disengage disc 33 from lock-pin 32, the human pilot by the palm of his hand turns the turn knob in either direction, depending upon the desired direction of turn, and thereby displaces stator 15 relative to rotor 13 whereupon an aileron control signal is generated in the stator and fed to amplifier 193. In this manner coordinated turn is achieved and should, during the turn, the craft skid or slip, pendulum 121 being responsive to dynamic vertical displacement, will actuate rudder to prevent the skid or slip.

It will be appreciated that if switch 58 is turned to its "Engage" position prematurely, i. e., before the gyros have been brought up to speed and the amplifiers warmed up as desired, time delay relay 140 will not have operated to engage contacts 142 and 145 so that holding winding 146 as well as relay coil 130 will be de-energized and when knob 59 is released in the "Engage" position, detent 90 will not register with cam slot 89 so that spring 80 will return the switch to the "On" position. There has thus been provided a novel safety feature in that the automatic pilot cannot be engaged with the craft control surfaces prematurely.

In the event that turn knob 17 is in some position other than its inoperative position when switch 58 is operated to its "Engage" position, neither holding winding 146 nor relay coil 130 will be energized because the circuit to ground for the winding and coil is broken by switch 36 which will be in an open position. Thus the automatic pilot cannot be engaged with the craft control surfaces until and unless turn knob 17 is in its centered and inoperative position wherein disc 33 is engaged by pin 32 and both switches 35 and 36 are closed. After relay coil 130 has been energized, however, opening of the circuit by operation of switch 36 will not affect engagement of the pilot because both relay coil 130 and holding winding 146 are grounded through relay armature 124 and relay contact 126.

There has thus been provided a novel manual turn controller unit for an automatic pilot together with novel safety switch interlocks whereby the automatic pilot cannot be engaged with the craft prematurely. Moreover, the controller is of such nature that during a turn maneuver the pilot, if trim in elevator is desired, may without removing his palm from the turn knob insert a pitch trim signal into elevator by merely displacing by means of his thumb knob 52 or 53 in an appropriate direction depending upon whether up or down elevator is desired.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

I claim:

1. A manual controller for an aircraft automatic pilot adapted for connection to and disconnection from the control surfaces of the craft, comprising a turn knob movable axially between an operative and an inoperative position, switch means for connecting the pilot with the control surfaces, and other switch means interconnected with said first switch means and operatively connected to said turn knob to prevent engagement of the automatic pilot with the control surfaces when said turn knob is in its operative position.

2. A manual controller for an aircraft automatic pilot adapted for connection to and for disconnection from the control surfaces of the craft, comprising a turn knob movable axially between an operative and an inoperative position, switch means operatively connected to said turn knob and actuated to an open circuit condition when the turn knob is in its operative position and to a closed circuit condition when the turn knob is in its inoperative position, and other switch means interconnected with said first switch means and operatively connected with said automatic pilot and adapted for engaging said pilot with said control surfaces only when said knob is in its inoperative position.

3. A manual controller for an aircraft automatic pilot adapted for connection to and for disconnection from the control surfaces of the craft, comprising a turn knob movable axially between an operative and an inoperative position, switch means operatively connected to said turn knob and actuated to an open circuit condition when the turn knob is in its operative position and to a closed circuit condition when the turn knob is in its inoperative position, other switch means interconnected with said first switch means and operatively connected with said automatic pilot and adapted for engaging said pilot with said control surfaces only when said knob is in its inoperative position, and a holding circuit interconnected with said last-mentioned switch means and energized when the pilot is engaged with said control surfaces for maintaining such engagement subsequent to actuation of said turn knob to an operative position.

4. A manual controller for an aircraft automatic pilot adapted for connection to and for disconnection from the control surfaces of the craft, comprising a turn knob having an operative and an inoperative position, switch means operatively connected to said turn knob and actuated to an open circuit condition when the turn knob is in its operative position and to a closed circuit condition when the turn knob is in its inoperative position, other switch means interconnected with said first switch means and operatively connected with said automatic pilot and adapted for engaging said pilot with said control surfaces only when said knob is in its inoperative position, and a relay connected with both of said switch means and energized when the pilot is engaged with said control surfaces for maintaining such engagement notwithstanding subsequent operation of the turn knob to its operative position.

5. A manual controller for an aircraft automatic pilot adapted for connection to and for disconnection from the control surfaces of the craft, comprising a turn knob having an operative and an inoperative position, switch means operatively connected to said turn knob and actuated to an open circuit condition when the turn knob is in its operative position and to a closed circuit condition when the turn knob is in its inoperative position, other switch means interconnected with said first switch means and operatively connected with said automatic pilot and adapted for engaging said pilot with said control surfaces only when said knob is in its inoperative position, a relay connected with both of said switch means and energized when the pilot is engaged with said control surfaces for maintaining such engagement notwithstanding subsequent operation of the turn knob to its operative position, and holding means connected to said second switch means and energized by the operation of the second switch means for maintaining the relay energized.

6. A manual controller for an aircraft automatic pilot adapted for connection to and for disconnection from the control surfaces of the craft, comprising a turn knob having an operative and an inoperative position, switch means operatively connected to said turn knob and actuated to an open circuit condition when the turn knob is in its operative position and to a closed circuit condition when the turn knob is in its inoperative position, other switch means having an off and an on position interconnected with said first switch means, a selector knob operatively connected to said other switch means for operating said other switch means, and said other switch including means operated by actuation of said selector knob from off to on position for connecting said pilot with a source of current for energizing the electrical components thereof.

7. A manual controller for an aircraft automatic pilot adapted for connection to and for disconnection from the control surfaces of the craft, comprising a turn knob having an operative and an inoperative position, switch means operatively connected to said turn knob and actuated to an open circuit condition when the turn knob is in its operative position and to a closed circuit condition when the turn knob is in its inoperative position, other switch means having an off, on and an engage position interconnected with said first switch means, a selector knob operatively connected to said other switch means for operating said other switch means, said other switch including means operated by actuation of said selector knob from off to on position for connecting said pilot with a source of current for energizing the electrical components thereof, and means comprising a relay interconnected with said last-mentioned means and operated by actuation of said selector knob from on to engage position, when the turn knob is in its inoperative position, for engaging the pilot with the control surfaces.

8. A manual controller for an aircraft automatic pilot adapted for connection to and for disconnection from the control surfaces of the craft, comprising a turn knob having an operative and an inoperative position, switch means operatively connected to said turn knob and actuated to an open circuit condition when the turn knob is in its operative position and to a closed circuit condition when the turn knob is in its inoperative position, other switch means having an off, on and engage position interconnected with said first switch means, a selector knob operatively connected to said other switching means for operating said other switch means, said other switch means including means operated by actuation of said selector knob from off to on position for connecting said pilot with a source of current for energizing the electrical components thereof, means comprising a relay interconnected with said last-mentioned means and operated by actuation of said selector knob from on to engage position, when the turn knob is in its inoperative position, for engaging the pilot with the control surfaces, and time delay means operatively connected with said relay for preventing energization of said relay until a predetermined period has been allowed for energizing the electrical components of the automatic pilot.

9. A manual controller for an aircraft automatic pilot adapted for connection to and for disconnection from the control surfaces of the craft, comprising a turn knob having an operative and an inoperative position, switch means operatively connected to said turn knob and actuated to an open circuit condition when the turn knob is in its operative position and to a closed circuit condition when the turn knob is in its inoperative position, other switch means having an off, on and engage position interconnected with said first switch means, a selector knob operatively connected to said other switching means for operating said other switch means, said other switch means including means operated by actuation of said selector knob from off to on position for connecting said pilot with a source of current for energizing the electrical components thereof, means comprising a relay interconnected with said last-mentioned means and energized by actuation of said selector knob from on to engage position, when the turn knob is in its inoperative position, for engaging the pilot with the control surfaces, and holding means connected to said other switching means and energized by actuation of the selector knob to maintain the relay in an energized condition whereby said pilot remains engaged with said control surfaces notwithstanding subsequent operation of said turn knob to an operative position.

10. In an automatic pilot system having a power means and a means for connecting and disconnecting said power means from a control surface, a manual controller comprising a signal generator operatively connected to said power means, actuating means operatively connected to said signal generator for actuating the latter, means mounting said actuating means for rotation to actuate said signal generator and for longitudinal displacement between an operative position and an inoperative position, said actuating means being free to rotate in said operative position and being held against rotation in said inoperative position, and means operatively connected to said actuating means, mounting means, and connecting and disconnecting means for preventing an initial connection of said power means with said surface when said actuating means is in said operative position.

References Cited in the file of this patent

UNITED STATES PATENTS

| Number | Name | Date |
|---|---|---|
| 2,417,821 | Harcum et al. | Mar. 25, 1947 |
| 2,451,444 | Norde | Oct. 12, 1948 |
| 2,463,170 | Grignon et al. | Mar. 1, 1949 |
| 2,466,702 | Hamby | Apr. 12, 1949 |
| 2,516,641 | Murphy | July 25, 1950 |
| 2,516,796 | Noxon et al. | July 25, 1950 |
| 2,571,745 | Moses, Jr. | Oct. 16, 1951 |
| 2,595,250 | Harcum | May 6, 1952 |